(12) United States Patent
Chen

(10) Patent No.: US 11,706,738 B2
(45) Date of Patent: *Jul. 18, 2023

(54) COMMUNICATION SYSTEM

(71) Applicant: NEC CORPORATION, Tokyo (JP)

(72) Inventor: Yuhua Chen, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,363

(22) Filed: Aug. 21, 2020

(65) Prior Publication Data

US 2020/0383087 A1 Dec. 3, 2020

Related U.S. Application Data

(63) Continuation of application No. 16/441,250, filed on Jun. 14, 2019, now Pat. No. 10,791,539, which is a
(Continued)

(30) Foreign Application Priority Data

Apr. 10, 2015 (GB) ..................... 1506156

(51) Int. Cl.
*H04W 68/02* (2009.01)
*H04W 4/70* (2018.01)
(Continued)

(52) U.S. Cl.
CPC ............. *H04W 68/02* (2013.01); *H04W 4/70* (2018.02); *H04W 68/00* (2013.01); *H04W 72/23* (2023.01)

(58) Field of Classification Search
CPC ..... H04W 68/02; H04W 4/70; H04W 72/042; H04W 72/1289
(Continued)

(56) References Cited

U.S. PATENT DOCUMENTS

| 7,881,724 | B2* | 2/2011 | Park | H04W 74/002 |
| | | | | 455/452.2 |
| 10,356,748 | B2* | 7/2019 | Chen | H04W 68/00 |

(Continued)

FOREIGN PATENT DOCUMENTS

| CN | 103548409 A | * | 1/2014 | ............ H04L 5/001 |
| CN | 107046737 A | * | 8/2017 | ............ H04W 48/10 |

(Continued)

OTHER PUBLICATIONS

3GPP TS 36.331 version 11.11.0 Release 11 2 ETSI TS 136 331 V11.11.0 (Apr. 2015).*

(Continued)

*Primary Examiner* — Charles T Shedrick

(57) ABSTRACT

A communication system is disclosed in which a base station receives, from a core network entity, a paging request for paging an MTC device. The base station determines a paging occasion for sending to said MTC device paging related information, wherein the paging occasion is defined such that it identifies a plurality of subframes in which the paging related information can be sent and repeated. The base station sends (and repeats, as appropriate) the paging related information in the plurality of subframes identified by the paging occasion.

4 Claims, 10 Drawing Sheets

Related U.S. Application Data continuation of application No. 15/564,490, filed as application No. PCT/JP2016/001951 on Apr. 8, 2016, now Pat. No. 10,356,748.

(51) Int. Cl.
*H04W 72/23* (2023.01)
*H04W 68/00* (2009.01)

(58) Field of Classification Search
USPC .......................................................... 455/458
See application file for complete search history.

(56) References Cited

U.S. PATENT DOCUMENTS

| | | | | |
|---|---|---|---|---|
| 2006/0007877 | A1* | 1/2006 | Vaittinen | H04W 76/34 370/328 |
| 2009/0310503 | A1* | 12/2009 | Tenny | H04W 76/28 370/252 |
| 2010/0022250 | A1* | 1/2010 | Petrovic | H04J 11/0093 455/450 |
| 2010/0111019 | A1* | 5/2010 | Wu | H04W 72/23 370/329 |
| 2010/0284376 | A1* | 11/2010 | Park | H04W 56/0045 370/336 |
| 2012/0300752 | A1* | 11/2012 | Kwon | H04W 56/0045 370/336 |
| 2013/0010641 | A1* | 1/2013 | Dinan | H04L 5/0094 370/254 |
| 2013/0046821 | A1* | 2/2013 | Alanara | H04W 52/0216 709/204 |
| 2013/0258888 | A1* | 10/2013 | Jeong | H04W 36/0066 370/252 |
| 2014/0029586 | A1* | 1/2014 | Loehr | H04L 5/0055 370/336 |
| 2014/0086208 | A1 | 3/2014 | Murray et al. | |
| 2014/0098761 | A1* | 4/2014 | Lee | H04W 74/006 370/329 |
| 2014/0286243 | A1* | 9/2014 | Yamada | H04W 76/15 370/329 |
| 2016/0192376 | A1* | 6/2016 | Lee | H04W 48/20 370/252 |
| 2016/0242203 | A1 | 8/2016 | You et al. | |
| 2016/0269885 | A1* | 9/2016 | Kim | H04L 5/001 |
| 2016/0278052 | A1 | 9/2016 | Kim et al. | |
| 2016/0353440 | A1* | 12/2016 | Lee | H04W 4/70 |
| 2017/0230897 | A1* | 8/2017 | Chen | H04W 48/12 |
| 2017/0311284 | A1* | 10/2017 | Basu Mallick | H04W 68/02 |
| 2018/0092062 | A1* | 3/2018 | Chen | H04W 68/00 |
| 2018/0317198 | A1* | 11/2018 | Lee | H04W 68/005 |

FOREIGN PATENT DOCUMENTS

| | | | | |
|---|---|---|---|---|
| EP | 2 836 032 | A1 | 2/2015 | |
| EP | 3211961 | A1 * | 8/2017 | H04W 48/10 |
| JP | 2002-532942 | A | 10/2002 | |
| JP | 2012-169969 | A | 9/2012 | |
| JP | 2013-536636 | A | 9/2013 | |
| WO | 2013/183966 | A1 | 12/2013 | |
| WO | 2014/157836 | A1 | 10/2014 | |
| WO | 2015/021320 | A1 | 2/2015 | |
| WO | 2015/050359 | A1 | 4/2015 | |
| WO | 2015/060639 | A1 | 4/2015 | |
| WO | 2015/076619 | A1 | 5/2015 | |

OTHER PUBLICATIONS

3GPP TS 22.368, V.13.1.0 (Dec. 2014), 3rd Generation Partnership Project; Technical Specification Group Services and System Aspects; Service requirements for Machine-Type Communications (MTC); Stage 1 (Release 13), Dec. 2014, pp. 1-26.

Qualcomm Incorporated, Paging for Rel. 13 LC MTC [online], 3GPP TSG-RAN WG2#89 R2-150526, Athens, Greece, Feb. 9-13, 2015; Internet<URL: http://www.3gpp.org/ftp/tsg_ran/WG2_RL2/TSGR2_89/Docs/R2-150526.zip> (3 pages total).

International Search Report of PCT/JP2016/001951 dated Jul. 11, 2016.

Huawei HiSilicon, Paging for Rel-13 low complexity MTC [online], 3GPP TSG-RAN WG2#89 R2-150257, Athens, Greece, Feb. 9-12, 2015; Internet<URL: http://www.3gpp.org/ftp/tsg_ranAA/G2_RL2/TSGR2_89/Docs/ R2-150257.zip>, (4 pages total).

Communication dated Apr. 18, 2018 from the Japanese Patent Office in counterpart application No. 2017-553196.

3GPP TSG RAN WG1 Meeting #74bis, R1-134472, Sharp, "PRACH coverage enhancement for MTC UE," pp. 1-3.

Written Opinion of the International Searching Authority of PCT/JP2016/001951 dated Jul. 11, 2016.

3GPP TSG RAN WG1 Meeting #74bis, R1-134395, Guangzhou, China, Oct. 7-11, 2013, LG Electronics, "PDCCH coverage enhancement for MTC," pp. 1-5.

3GPP TSG RAN WG1 Meeting #72, R1-130423, St Julian's, Malta, Jan. 28-Feb. 1, 2013, Renesas Mobile Europe Ltd, "Physical channels coverage enhancements for MTC," 6 pages.

* cited by examiner

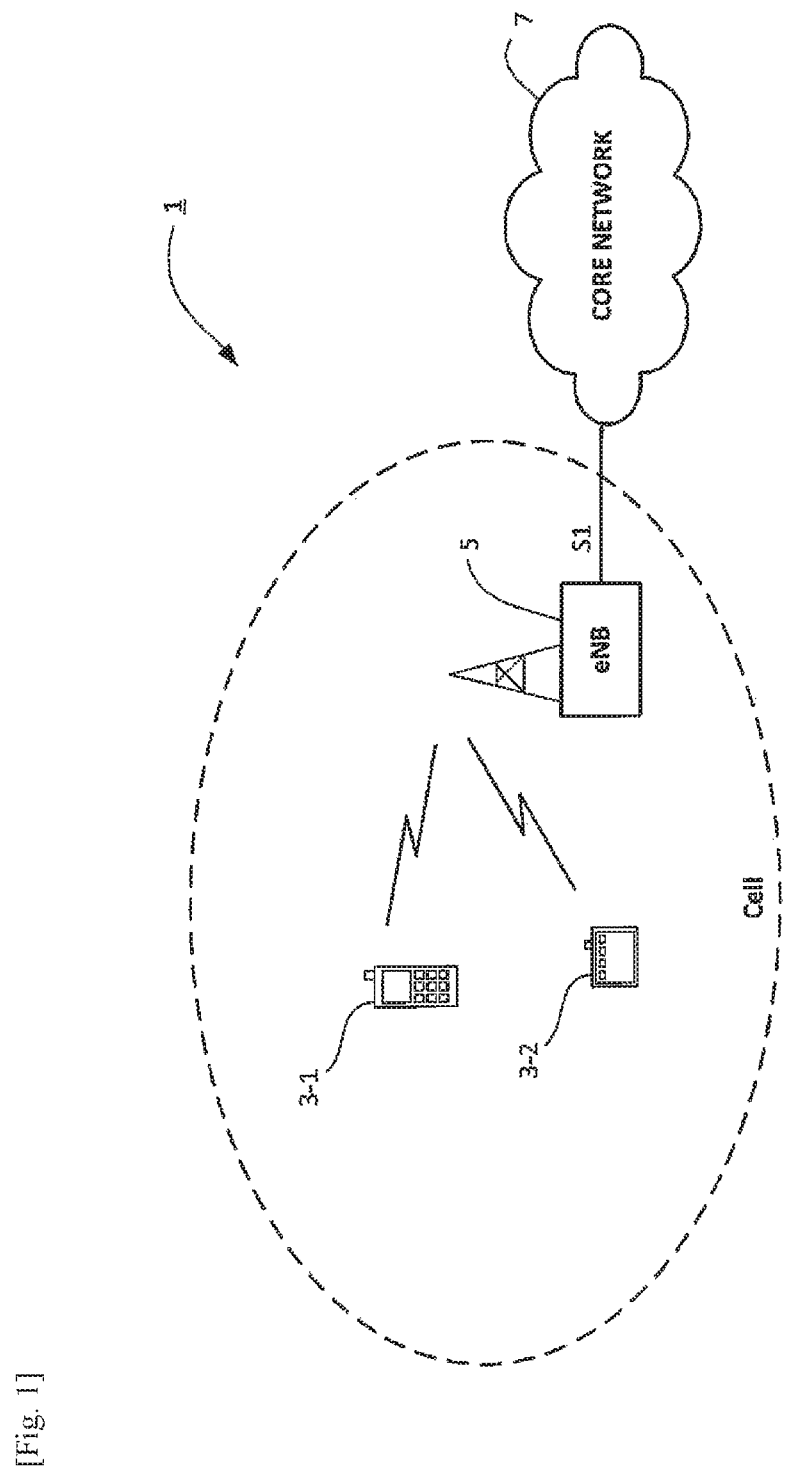
[Fig. 1]

[Fig. 2]
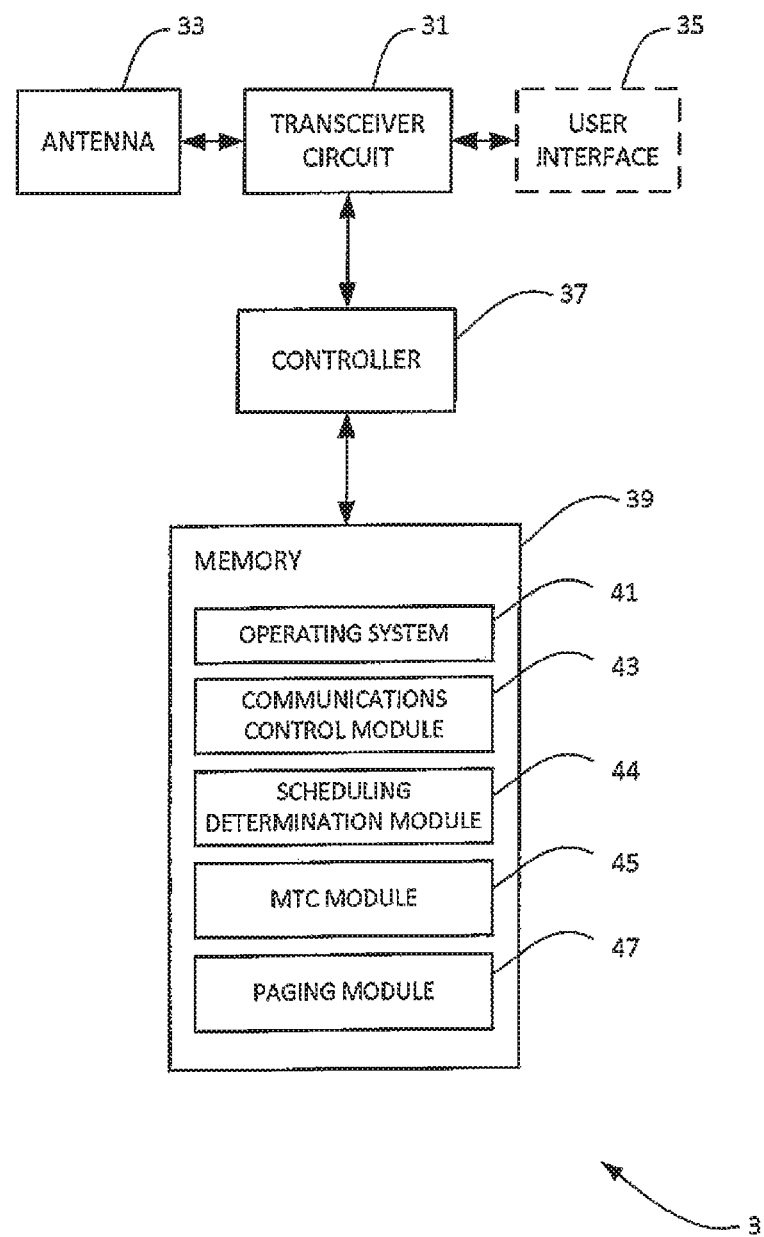

[Fig. 3]
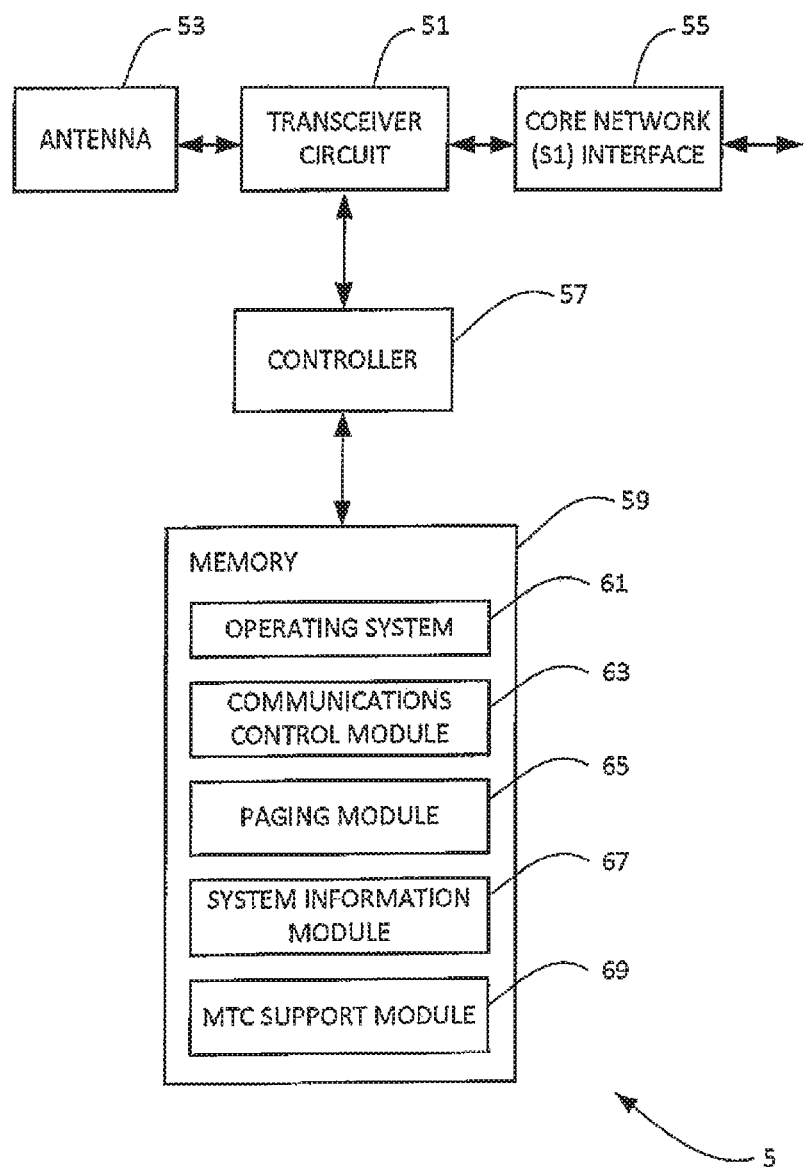

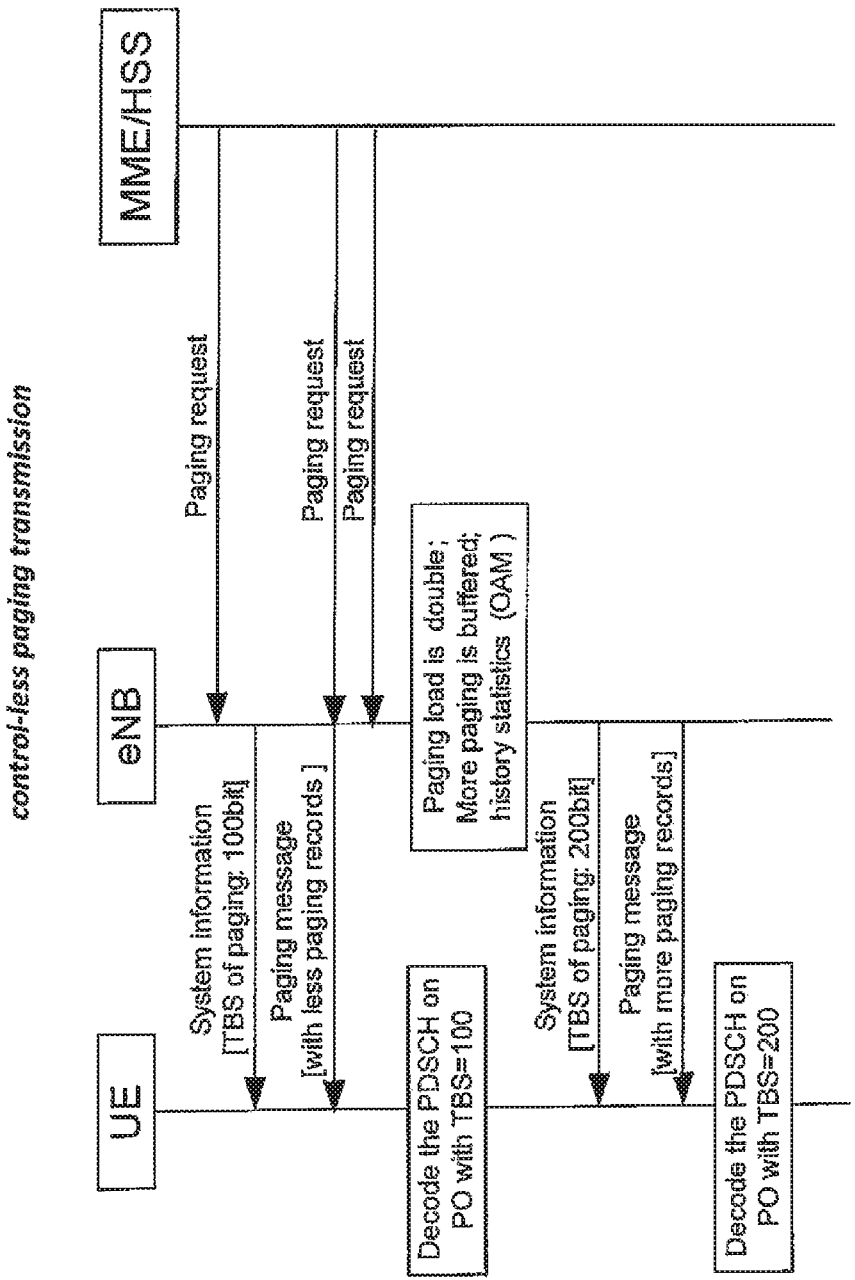
[Fig. 4]

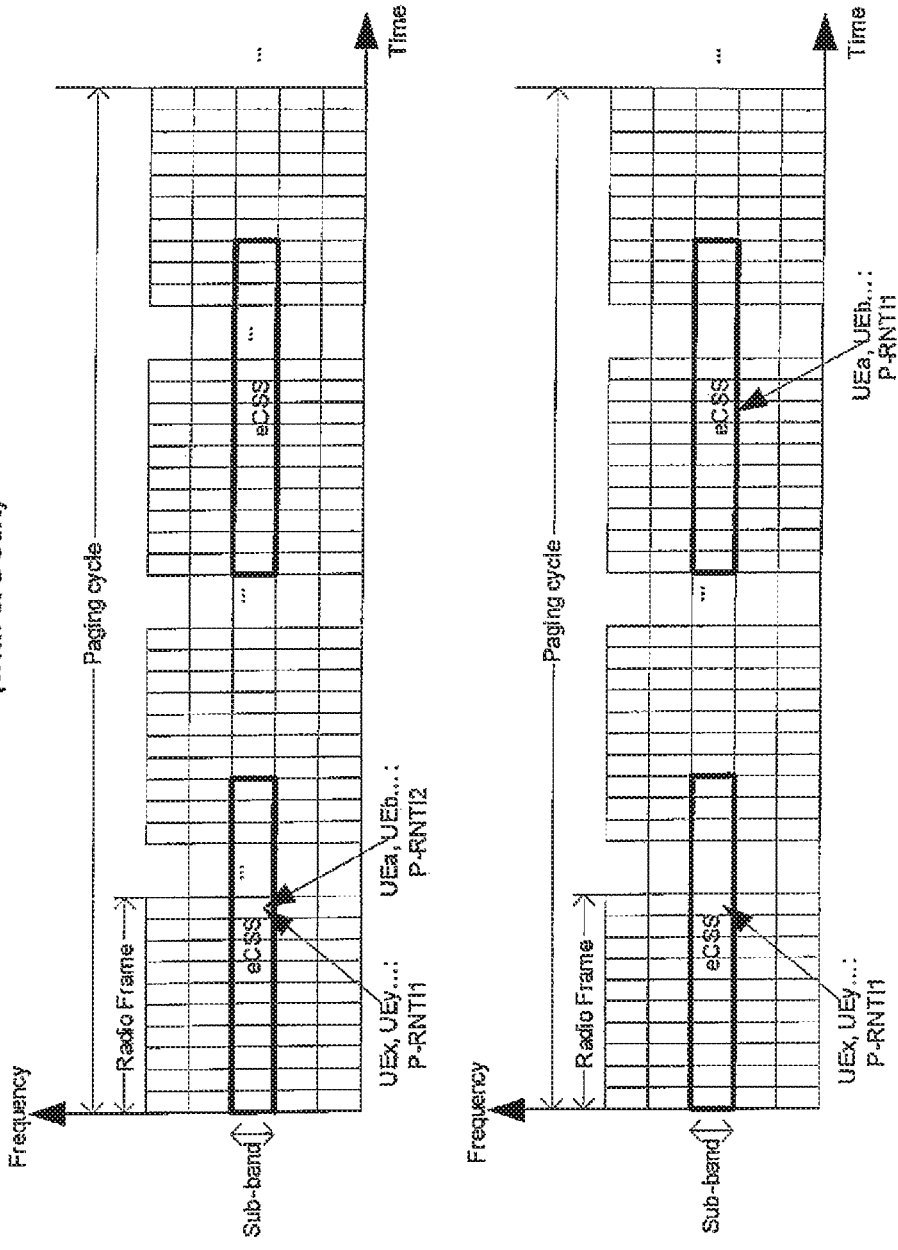
[Fig. 5]

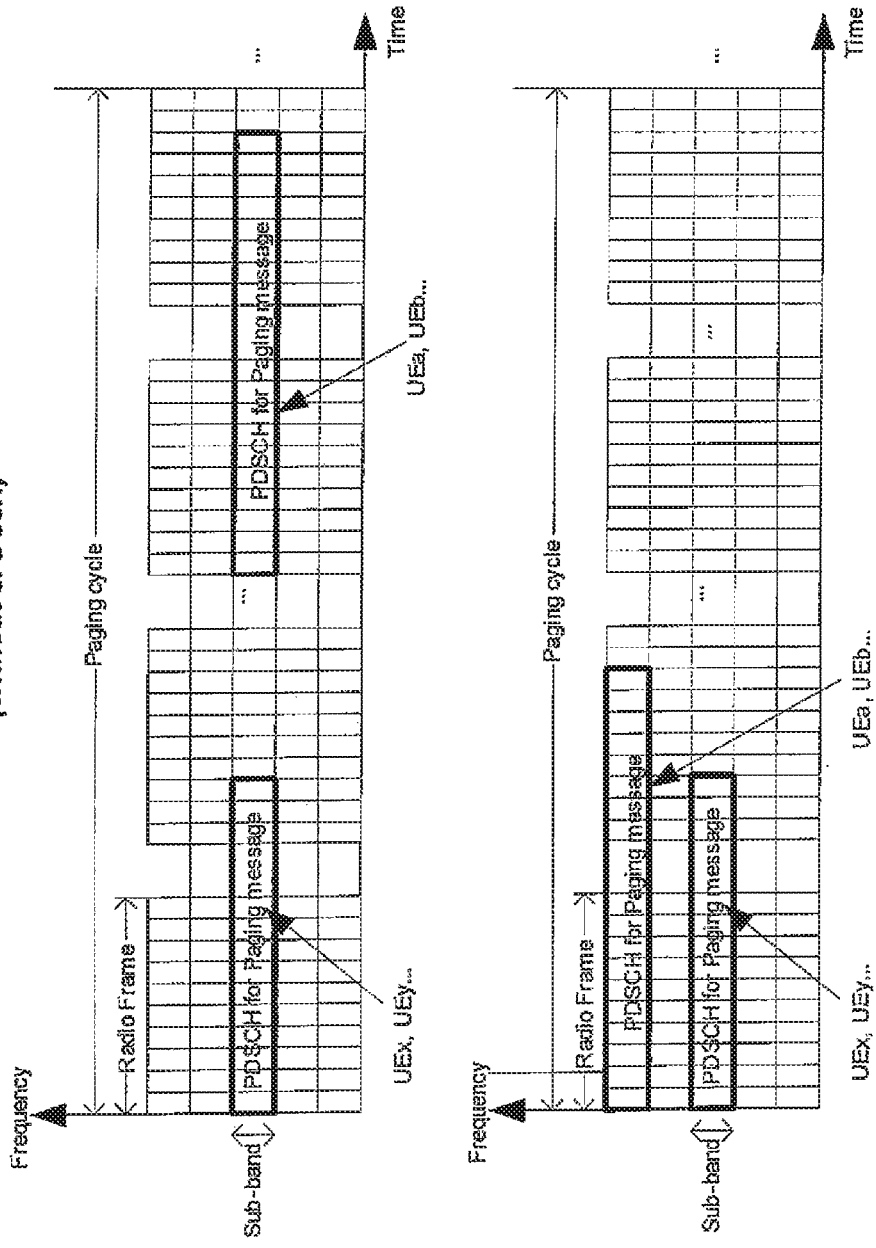
[Fig. 6]

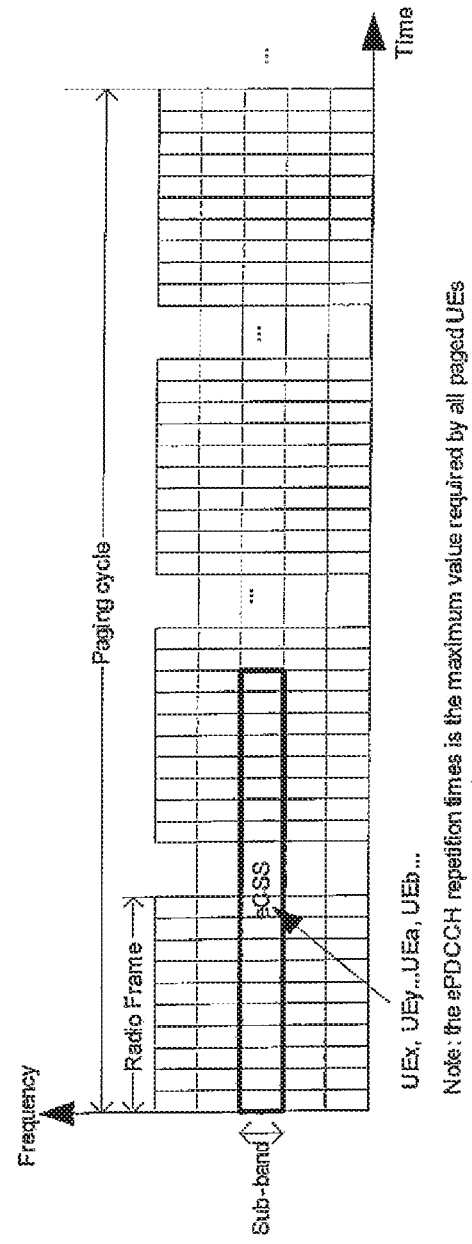

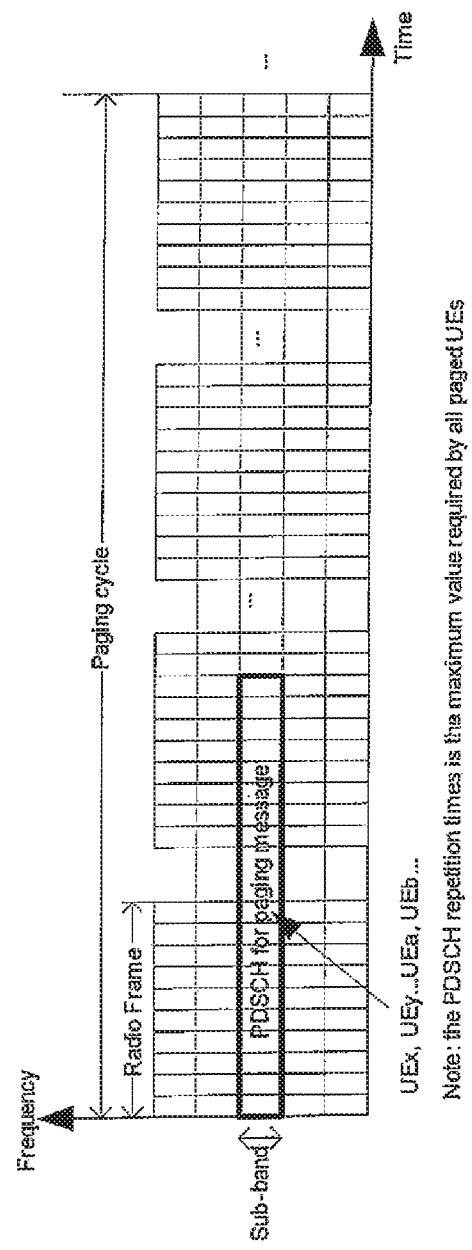
[Fig. 8]

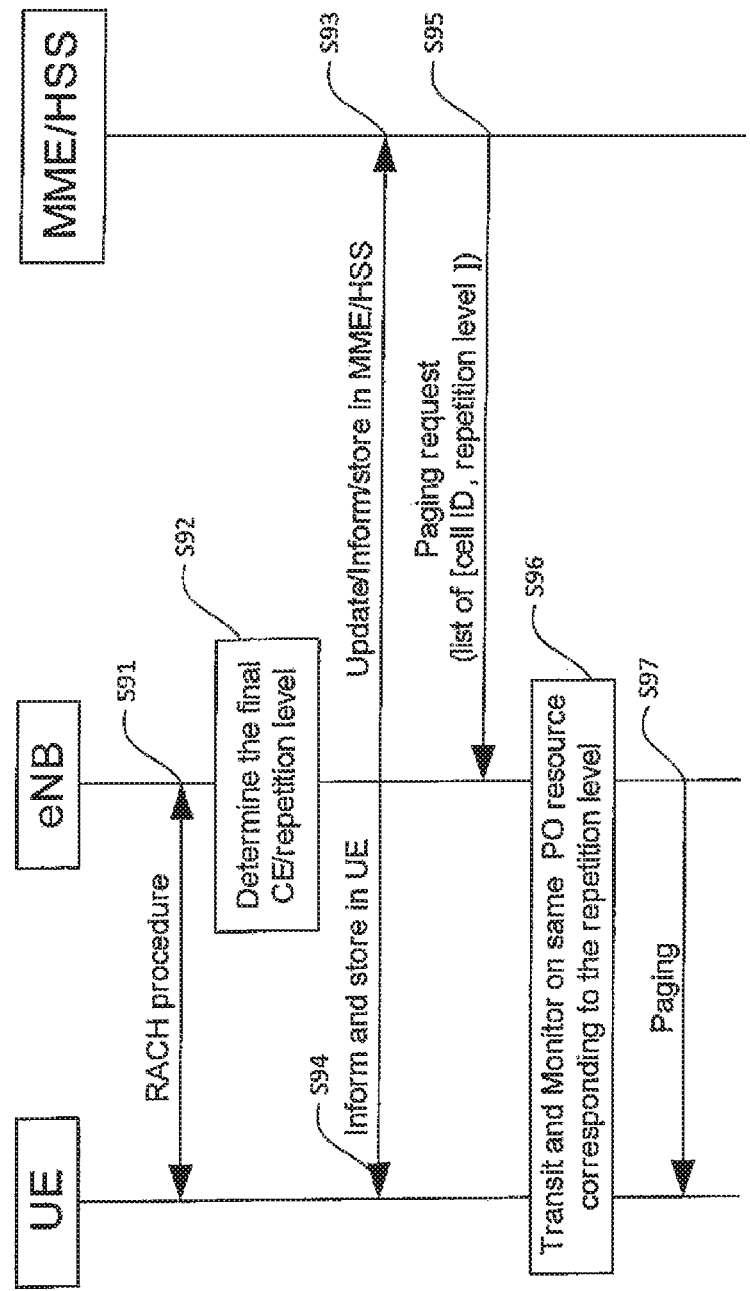

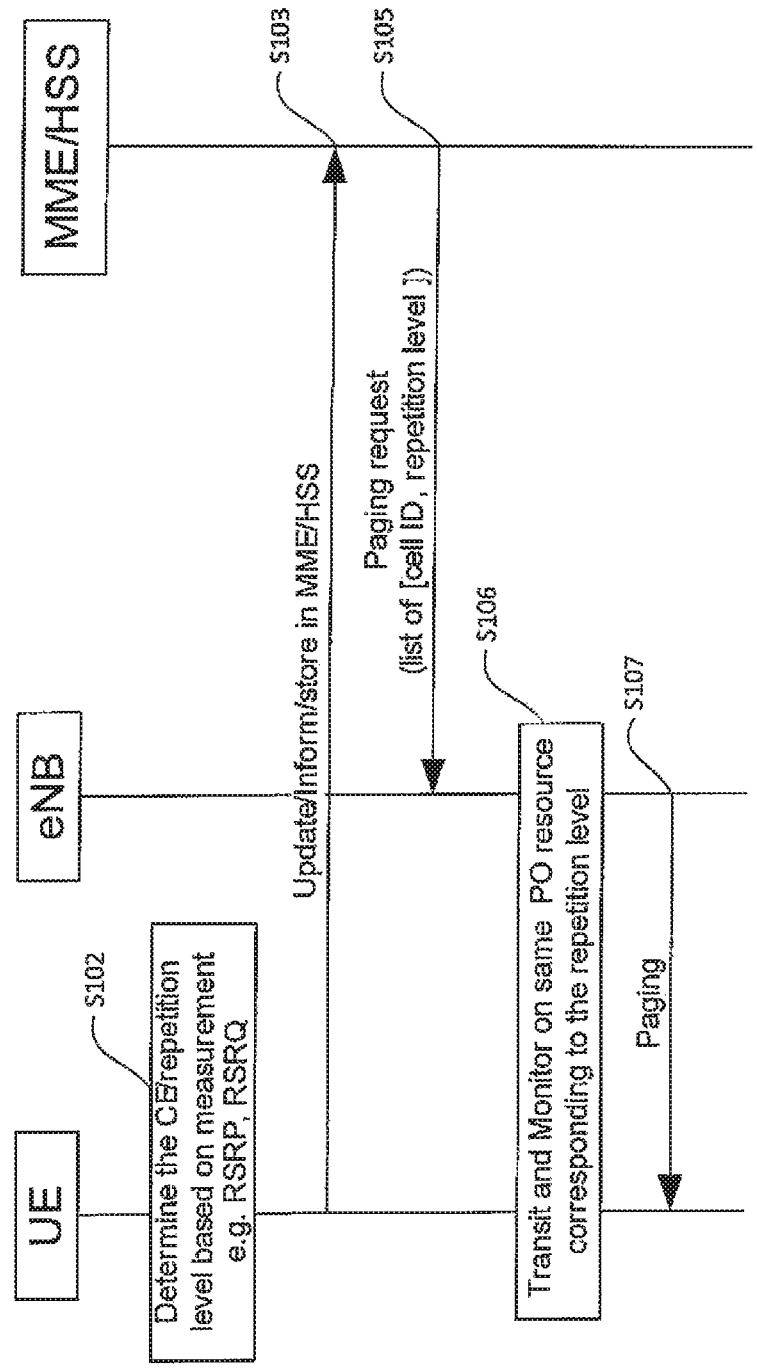

COMMUNICATION SYSTEM

CROSS REFERENCE TO RELATED APPLICATIONS

This application is a continuation of U.S. application Ser. No. 16/441,250 filed Jun. 14, 2019, which is a continuation of U.S. application Ser. No. 15/564,490 filed on Oct. 5, 2017, which is a National Stage of International Application No. PCT/JP2016/001951 filed Apr. 8, 2016, and claims priority from British Patent Application No. 1506156.7 filed Apr. 10, 2015, the contents of all of which are incorporated herein by reference in their entireties.

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)), including LTE-Advanced.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

In order to be able to communicate via the base stations, communication devices need to monitor control channels operated by the base stations. One of these control channels, the so-called physical downlink control channel (PDCCH) and/or the so-called evolved PDCCH (EPDCCH) in Rel-13, carries the scheduling assignments and other control information. The (E)PDCCH serves a variety of purposes. Primarily, it is used to convey the scheduling decisions to individual communication devices, i.e. scheduling assignments for uplink and downlink communication.

The information carried on the (E)PDCCH is referred to as downlink control information (DCI). Physical control channels, such as the (E)PDCCH, are transmitted on an aggregation of one or several consecutive control channel elements (CCEs), where a control channel element corresponds to nine resource element groups (REGs). Each REG has four resource elements (REs).

A paging channel is provided over (mapped to) the physical downlink shared channel (PDSCH) for notifying communication devices about a system information change and/or incoming communications for one or more communication devices (such as mobile terminated calls, short text messages, downlink data, and/or the like). Paging messages (although they are transmitted over the PDSCH) are scheduled via the (E)PDCCH. Specifically, in each radio frame transmitted by the base station there is at least one predetermined paging occasion (PO) (a maximum of four POs per radio frame), each PO being a subframe in which the base station may transmit control data over the PDCCH in order to schedule an associated paging message. Each paging message can identify one or more communication devices for which the paging message is sent. Whenever a PO includes a so-called paging identifier, i.e. a paging radio network temporary identifier (P-RNTI), which is the same for all LTE devices in the cell, each communication device processes the control data, and proceeds to decoding the paging message broadcast over the paging channel (at the time-frequency resource identified by the control data).

In more detail, whenever there is downlink data (or incoming call) for a particular communication device, the network notifies the base station(s) that may be serving that communication device about the data (or call). In response to this, the base station generates a radio resource control (RRC) paging message and transmits the generated paging message for the communication device (by broadcasting via the PDSCH). The paging message is scheduled using one of the predetermined POs, the location of which is known to the communication devices (e.g. from the base station's system information broadcast). The paging message includes one or more paging records identifying each communication device being paged and the reason for paging that communication device.

If a communication device finds the (E)PDCCH addressed by P-RNTI in (the control data sent via) the PO, then it proceeds to receiving and decoding the RRC paging message from the PDSCH resource block (RB) identified by the associated control data transmitted via the PDCCH PO. If a paging record is found for a particular communication device in the decoded RRC paging message, then that communication device proceeds to respond to the paging message (whilst other, non-paged, communication devices continue monitoring for the next PO). If appropriate, the paged communication device performs a random access procedure with the base station in order to establish a connection with the network and to be able to respond to the incoming communication that the paging message (i.e. the communication device's paging record) relates to.

Recent developments in telecommunications have seen a large increase in the use of machine-type communications (MTC) devices which are networked devices arranged to communicate and perform actions without human assistance. Examples of such devices include smart meters, which can be configured to perform measurements and relay these measurements to other devices via a telecommunication network. Machine-type communication devices are also known as machine-to-machine (M2M) communication devices.

MTC devices connect to the network (after performing an appropriate random access procedure, if necessary) whenever they have data to send to or receive from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP technical specification (TS) 22.368 V13.1.0 the contents of which are incorporated herein by reference.

For the Release 13 (Rel-13) version of the standards relating to MTC devices, support for a reduced bandwidth of 1.4 MHz in downlink and uplink is envisaged. Thus, some MTC devices will support only a limited bandwidth (typically 1.4 MHz) compared to the total LTE bandwidth and/or they may have fewer/simplified components. This allows such 'reduced bandwidth' MTC devices to be made more economically compared to MTC devices supporting a larger bandwidth and/or having more complicated components. Beneficially, the EPDCCH is transmitted over a relatively narrow frequency spectrum (1.4 Mhz) that makes it compatible with Rel-13 reduced bandwidth MTC devices.

The lack of network coverage (e.g. when deployed indoors), in combination with the often limited functionality of MTC devices, can result in such MTC devices having a low data rate and therefore there is a risk of some messages or channels, such as the EPDCCH, not being received by an MTC device. In order to mitigate this risk, it has been proposed to increase the coverage of transmissions to support such MTC devices (e.g. corresponding to 20 dB for frequency division duplex (FDD) transmissions).

One approach proposed for the enhancement of coverage, for so-called 'coverage enhanced MTC devices', is the repetition of the same information (e.g. a DCI sent over the EPDCCH) across multiple subframes (e.g. two, three, or four subframes). In other words, for coverage enhanced (CE) MTC devices, the base station duplicates the transmitted information in the time domain (the base station retransmits the same information in one or more subframes subsequent to the subframe in which that information is first sent). Such a coverage enhanced MTC device can be configured to combine the multiple copies of the (same) information received in the multiple subframes, and after combining the received information, the coverage enhanced MTC device is more likely to be able to decode the received information successfully than based on a single copy of the transmitted information. Similarly to the repetition of the same information by the base station, coverage enhanced MTC devices are also configured to duplicate (in the time domain) information transmitted to the base station to facilitate successful reception of that information at the base station.

In practice, MTC devices may be deployed in different locations and they may experience different channel conditions. Therefore, the number of repetitions may need to be tailored for each device's situation or coverage level, and each MTC device informs its serving base station of the amount of coverage required (e.g. 5 dB/10 dB/15 dB/20 dB coverage enhancement) to allow the base station to adjust its control signalling appropriately.

Paging messages are transmitted separately for MTC devices (e.g. low-complexity and/or coverage enhanced MTC devices) and for other (non-MTC) communication devices, such as conventional mobile telephones. Furthermore, 3GPP envisaged that paging messages for MTC devices may be transmitted in different subbands in dependence on the MTC device's mode of operation (e.g. whether it is operating in normal coverage mode (0 dB CE level), at 5 dB CE level, at 10 dB CE level, or at 15 dB CE level).

SUMMARY OF INVENTION

Technical Problem

It can be seen, therefore, that where the paging is intended for a CE MTC device repetition of transmissions will need to be supported. However, current paging procedures do not support such repetition.

TABLE 1

| Service Area | MTC applications |
| --- | --- |
| Security | Surveillance systems |
| | Backup for landline |

TABLE 1-continued

| Service Area | MTC applications |
| --- | --- |
| | Control of physical access |
| | (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Moreover, even if repetition were supported, there can be uncertainty, at the base station, regarding the type of MTC device being paged and/or its required coverage enhancement level which can result in an incorrect number of repetitions being used and/or paging messages being sent in the wrong time-frequency resource, and/or with wrong format. For example, if the CE level is linked to the specific 1.4 MHz sub-band (the paging location) in which paging communications are broadcast (as currently proposed by some 3GPP participants), then this uncertainty regarding the CE level can result in some low-complexity MTC devices being tuned to a 1.4 MHz bandwidth that is outside the subband over which the paging message (and/or the associated control data) is transmitted for these MTC devices. However, there is no trivial way of ensuring that the CE level employed by the communication device is the same as the CE level employed by the base station (for that communication device).

Accordingly, the present invention seeks to provide systems, devices and methods which at least partially address the above issues.

Solution to Problem

In one aspect, the invention provides a base station for a communication system in which machine type communication 'MTC' devices communicate via said base station, the base station comprising: means for determining that there is a requirement to notify said MTC devices that there has been a system information update; means for notifying any idle mode MTC devices about the system information update by sending a notification using a paging message; and means for providing any radio resource control 'RRC' connected mode MTC devices with the system information using MTC device dedicated signalling.

In one aspect, the invention provides a machine type communication 'MTC' device for communicating with a base station, the MTC device comprising: means for forming a radio resource control 'RRC' connection with said base station to enter an RRC connected mode; a transceiver configured to obtain, using dedicated signalling, system information associated with a cell of the base station, when in said RRC connected mode.

In one aspect, the invention provides a method performed by a base station for a communication system in which machine type communication 'MTC' devices communicate via said base station, the method comprising: determining that there is a requirement to notify said MTC devices that there has been a system information update; notifying any idle mode MTC devices about the system information update by sending a notification using a paging message; and providing any radio resource control 'RRC' connected mode MTC devices with the system information using MTC device dedicated signalling.

In one aspect, the invention provides a method performed by a machine type communication 'MTC' device in a communication system in which MTC devices communicate via a base station, the method comprising: forming a radio resource control 'RRC' connection with said base station to enter an RRC connected mode; and obtaining, using dedicated signalling, system information associated with a cell of the base station, when in said RRC connected mode.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Embodiments of the invention will now be described by way of example only with reference to the attached figures in which:

BRIEF DESCRIPTION OF DRAWINGS

FIG. 1 schematically illustrates a telecommunication system to which embodiments of the invention may be applied;

FIG. 2 is a block diagram illustrating the main components of the communication device shown in FIG. 1;

FIG. 3 is a block diagram illustrating the main components of the base station shown in FIG. 1;

FIG. 4 illustrates an exemplary way in which paging can be realised in the system shown in FIG. 1;

FIG. 5 illustrates an exemplary paging configuration option that can be employed in the system shown in FIG. 1;

FIG. 6 illustrates another exemplary paging configuration option that can be employed in the system shown in FIG. 1;

FIG. 7 illustrates another exemplary paging configuration option that can be employed in the system shown in FIG. 1;

FIG. 8 illustrates another exemplary paging configuration option that can be employed in the system shown in FIG. 1;

FIG. 9 illustrates an exemplary way in which a required coverage enhancement level (to be employed in a particular cell) can be determined for a communication device in the system shown in FIG. 1; and FIG. 10 illustrates another exemplary way in which a required coverage enhancement level (to be employed in a particular cell) can be determined for a communication device in the system shown in FIG. 1.

DESCRIPTION OF EMBODIMENTS

<Overview>

FIG. 1 schematically illustrates a mobile (cellular) telecommunication system 1 in which communication devices 3 (such as mobile telephone 3-1 and MTC device 3-2) can communicate with each other and/or with other communication nodes via an E-UTRAN base station 5 (denoted 'eNB') and a core network 7. As those skilled in the art will appreciate, whilst one mobile telephone 3-1, one MTC device 3-2, and one base station 5 are shown in FIG. 1 for illustration purposes, the system, when implemented, will typically include other base stations and communication devices.

Each communication device 3 may fall into one or more categories of UEs. A first category of UEs include communication devices that support only an earlier release of the LTE standard (e.g. Rel-8, Rel-9, Rel-10, Rel-11, and/or Rel-12). Such communication devices are commonly referred to as legacy UEs (assuming that the base station 5 is operating in accordance with Rel-13 of the LTE standards). It will be appreciated that some communication devices that belong to this category may not support the EPDCCH (only PDCCH). A second category of UEs include communication devices that support the current release of the LTE standard (e.g. Rel-13 and/or later). A third category of UEs include reduced bandwidth UEs (e.g. Rel-13 MTC devices capable of using a 1.4 Mhz bandwidth only), which are not able to communicate over the entire bandwidth available in the cell of the base station 5. A fourth category of UEs includes coverage enhanced UEs (e.g. some MTC devices), which require certain base station functionalities to be simplified and/or relaxed (although such coverage enhanced UEs may support other functionalities as normal).

In this example, the mobile telephone 3-1 comprises a Rel-13 UE, and the MTC device 3-2 comprises a reduced bandwidth MTC device (which may also be configured for an appropriate level of coverage enhancement). Although not shown in FIG. 1, it is assumed that a number of other MTC devices are also present within the cell of the base station 5.

The base station 5 is connected to the core network 7 via an S1 interface. The core network 7 includes, amongst others: a gateway for connecting to other networks, such as the Internet and/or to servers hosted outside the core network 7; a mobility management entity (MME) for keeping track of the locations of the communication devices 3 (e.g. the mobile telephone and the MTC device) within the communication network 1; and a home subscriber server (HSS) for storing subscription related information (e.g. information identifying which communication device 3 is configured as a machine-type communication device) and for storing control parameters specific for each communication device 3.

The base station 5 is configured to transmit a physical downlink control channel (PDCCH) and an evolved PDCCH (EPDCCH) for reception by the communication devices 3 located within the base station's 5 cell. The (E)PDCCH allocates uplink and downlink resources to the communication devices 3. One difference between the PDCCH and the EPDCCH is that the EPDCCH uses a relatively narrow frequency spectrum (1.4 Mhz) that makes it compatible with Rel-13 reduced bandwidth MTC devices, whilst PDCCH uses a wider frequency spectrum in order to provide backward compatibility with legacy communication devices.

The so-called common search space (CSS) is a search space for all/multiple UEs in a cell to blindly decode the PDCCH(s) carrying downlink control information (DCI) which is common to all/multiple communication devices 3. For example, the CSS may carry downlink control information (DCI) for: system information blocks (SIBs) which contain information related to cell access parameters; random access channel (RACH) messages; and/or the paging channel (PCH). In LTE Rel-13, the CSS (also referred to as 'eCSS') forms part of the search space of the EPDCCH.

Due to the reduced bandwidth of 1.4 MHz in downlink and uplink, the MTC device 3-2 cannot receive the PDCCH which is densely spread across the entire cell bandwidth (i.e. it may be transmitted over frequencies falling outside the 1.4 MHz supported by the MTC device 3-2). However, the MTC device 3-2 can receive the EPDCCH CSS (eCSS) which is transmitted over 6 RBs, i.e. within the 1.4 MHz band supported by the MTC device 3-2.

In order to support MTC devices, the base station's 5 cell bandwidth includes a number of subbands (e.g. non-overlapping subbands), each subband comprising 6 RBs (or less). Beneficially, since bandwidth reduced MTC devices are able to communicate over a maximum of 1.4 MHz bandwidth (which roughly corresponds to 6 RBs), the communication device 3-2 is able to send and receive (eCSS and other) data over the particular subband that its transceiver is currently tuned to.

Paging messages are transmitted separately for MTC devices (e.g. low-complexity and/or coverage enhanced MTC devices) and for other communication devices. Paging messages for MTC devices support PDSCH subframe bundling/repetition with multiple bundle sizes/repetition levels (in accordance with the required level of coverage enhancement). Beneficially, the base station 5 paging the communication device 3-2 is provided with information that allows it to determine that the communication device 3-2 comprises a low-complexity (bandwidth reduced) MTC device and/or an MTC device configured for coverage enhancement. The base station 5 is provided with information that allows it to determine the amount of coverage enhancement (repetitions) required during paging message transmission.

Advantageously, the base station 5 and the MTC device 3-2 are configured to employ the same CE level for paging (and indeed other communications) in the base station's 5 cell. The appropriate CE level may be determined (e.g. based on signal strength or quality) by either the base station 5 or the MTC device 3-2 (and notified to the other one). The appropriate CE level is kept synchronised between the base station 5 and the MTC device 3-2 (either directly or via the core network 7). Beneficially, the appropriate CE level for a communication device is notified to the core network (e.g. the MME), and thus when initiating paging the MME is able to instruct the respective paging base station for each cell of a particular tracking area (TA) to employ an appropriate CE level in that cell for the MTC device that is being paged.

It will be appreciated that when a communication device to be paged is operating in the so-called idle state, its location is known to MME on a tracking area (TA) basis only (rather than on a cell level). Therefore, the MME instructs all base stations within that TA (including e.g. base station 5 in FIG. 1) to transmit an appropriately formatted RRC paging message (including a paging record for that communication device in the RRC paging message) by employing the required CE level for their cell with respect of the paged communication device. The term idle state as used herein refers to an operational mode in which the communication device is currently not sending/receiving user data over its dedicated radio bearer(s), although its transceiver may be active (e.g. it may still receive broadcast data, perform signal measurements, and/or the like).

As with conventional paging a paging occasion (PO) is configured for paging the MTC devices. Beneficially, however, the PO defines a plurality ('bundle') of subframes in a certain subband (e.g. by defining the start point—or index of the first subframe—of that bundle of subframes).

In the examples described in more detail below, the system may employ scheduling (e.g. Layer 1 (L1) scheduling) of the paging transmissions via the ePDCCH. However, in a particularly beneficial example control-less paging is used, i.e. paging without requiring associated resources being scheduled in the ePDCCH. Instead, paging messages are transmitted over a transmission block of predetermined size (and over a predetermined subband), which can be received by each communication device 3 within the cell of the base station 5.

The bundle of subframes defined by the PO are subframes in which the MTC device is to monitor the repetitions of the ePDCCH for paging message scheduling in the case where the ePDCCH is used to schedule paging transmission. The bundle of subframes defined by the PO are subframes in which the MTC device is to monitor the repetitions of the PDSCH for a paging message in the case where the ePDCCH is not used for scheduling paging transmission.

The base station 5 may configure different resources and/or paging regions per CE level to effectively separate the paging for MTC devices having different CE levels between different respective resources and/or paging regions. However, in a particularly beneficial example, paging message transmissions are not separated for different coverage enhancement levels (allowing all MTC devices, regardless of CE level, to benefit from scheduled or control-less paging in the same subband). In this case, paging message transmissions may be realised using either with or without ePDCCH.

In summary, the above described communication system supports various beneficial options for paging communication devices within the cell of the base station, with particular focus on the limitations of MTC devices. Paging messages can be scheduled dynamically and (if applicable) in dependence on the required CE level for each MTC device without (significantly) affecting legacy and/or conventional communication devices in the cell.

<Communication Device>

FIG. 2 is a block diagram illustrating the main components of the communication device 3 shown in FIG. 1. The communication device 3 may be an MTC device or a mobile (or 'cellular') telephone configured as a machine-type communication device. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3, however this user interface 35 may be omitted for some MTC devices.

The operation of the transceiver circuit 31 is controlled by a controller 37 in accordance with software stored in memory 39. The software includes, among other things, an operating system 41, a communications control module 43, a scheduling determination module 44, an MTC module 45, and a paging module 47.

The communications control module 43 controls communications between the communication device 3 and the base station 5 and/or other communication nodes (via the base station 5).

The scheduling determination module 44 monitors transmissions by the base station 5 in predetermined POs (if applicable) and determines whether or not the monitored POs include control data for scheduling a paging transmission. If a monitored PO does include such control data, then the scheduling determination module 44 determines the communication resources (e.g. subframe/subband) associated with the paging transmission. In case a control-less is being used, the scheduling determination module 44 maintains information identifying the resources over which control-less paging messages can be transmitted and instructs the paging module 47 to decode paging messages transmitted therein.

The MTC module 45 is operable to carry out machine-type communication tasks. For example, the MTC module 45 may collect data for sending (e.g. periodically and/or upon detecting a trigger) to a remote server (via the transceiver circuit 31). The MTC module 45 is also responsible for obtaining (determining and/or obtaining from the base station 5) an appropriate CE level to be used in the cell of the base station 5 serving the communication device 3.

The paging module 47 receives (over appropriate communication resources determined by the scheduling module 44) and processes paging messages addressed to the communication device 3.

<Base Station>

FIG. 3 is a block diagram illustrating the main components of the base station 5 shown in FIG. 1. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from a core network 7 via an appropriate core network interface 55 (such as an S1 interface). The operation of the transceiver circuit 51 is controlled by a controller 57 in accordance with software stored in memory 59.

The software includes, among other things, an operating system 61, a communications control module 63, a paging module 65, a system information module 67, and an MTC support module 69.

The communications control module 53 controls communications with the communication devices 3.

The paging module 65 generates and transmits paging messages (via the communications control module 63) for communication devices 3 located within the cell of the base station 5.

The system information module 67 is responsible for broadcasting system information (such as configuration of the cell of the base station 5) and/or other broadcast transmissions for receipt by the communication devices 3 located within the cell of the base station 5. For example, the broadcast portion transmits, over appropriate PO(s), paging messages (generated by the paging module 65).

The MTC support module 69 handles (generates, sends, and receives) messages for MTC devices in the cell of the base station 5. The MTC support module 69 is responsible for ensuring that each such message is transmitted using the required number of repetitions (in dependence on the CE level, if configured) and using the appropriate time and frequency resources (in a given subframe/within the 1.4 MHz band supported by the MTC devices). The MTC support module 69 is also responsible for obtaining (determining and/or obtaining from the core network 7) an appropriate CE level to be employed in the cell of the base station 5 when communicating with the communication device 3.

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

<Operation—General>

FIG. 4 illustrates an exemplary way in which paging can be realised in the communication system 1 shown in FIG. 1. Specifically, in this example, paging messages are transmitted over the PDSCH without any associated control data (DCI) being transmitted over the (E)PDCCH for scheduling the paging transmissions. Beneficially, the location (e.g. time/frequency resource) and the size of the paging message (e.g. determined by an associated transport block size (TBS)) are configured via system information broadcast.

Moreover, the location and/or the size of the paging message may also be updated via system information broadcast, if necessary. For example, the base station 5 is able to indicate/adjust the TBS for paging message via the system information based on at least one of:

the (current) average MTC paging load in the cell;
the number of connected UEs in the cell; and
the (measured/determined/estimated) resource usage for the base station (not limited to MTC paging).

In addition, other paging related information may also be indicated via the system information, such as the PO(s) (e.g. a start point thereof in the ePDCCH/PDSCH) currently configured for the base station's 5 cell. It will be appreciated that a different PO(s) may be configured (and broadcast via the system information) for each category of communication devices and/or for each CE level.

<Operation—Paging for System Information Change>

In order to inform the communication devices 3 located within the cell of the base station 5 about a change of the system information (e.g. PO configuration, paging TBS, channel configuration, and/or the like), the base station 5 is configured to generate and send an appropriately formatted paging message to the communication devices 3. The system information change paging is carried out using a one bit indicator (known as 'systemInfoModification' bit) which is transmitted together with other regular (UE specific) paging records, if any. When it is about to change any system information element, the base station 5 transmits this indicator bit on all POs for all communication devices in its cell in order to ensure that each communication device 3 has an opportunity to receive the updated system information without delay. Each communication device receiving (via any PO) a paging message that includes the system information change indicator bit proceeds to obtaining the updated system information by listening to the next system information broadcast (e.g. at the boundary of the 'BCCH modification period').

It will be appreciated, however, that a system information change may be notified in a different way for communication devices (at least for MTC devices) operating in the 'RRC_IDLE' and in the 'RRC_CONNECTED' state.

System Information Change for UEs in RRC_IDLE

It will be appreciated that for communication devices in idle mode, the system information modification indicator is transmitted together with normal paging record(s). In this case, the base station 5 needs to send the system information change indicator bit on all POs thereby addressing all types of communication devices (including MTC devices and legacy UEs as well).

Optionally, e.g. if system information changes are relatively frequent, paging for system information modification may be separated from normal paging. In this case, preferably, paging for system information is transmitted in a predetermined common subband (e.g. the central subband), and all communication devices need to be configured to work on this common subband (at least during the PO) and monitor for the system information modification bit in one or more POs of this subband. Consequently, MTC devices cannot be scheduled in other subbands during the paging occasions for system modification in the common subband. However, in this case there is no need to include the 'systemInfoModification' bit in every PO in every subband, albeit requiring some additional paging monitoring by the MTC devices, which might slightly increase their power consumption.

System Information Change for UEs in RRC_CONNECTED

It is likely that communication devices in RRC_CONNECTED mode are scheduled on a subband that is different from the subband for monitoring paging. In any case, it will be appreciated that the system information modification indicator may be transmitted together with normal paging record(s), as above, i.e. the base station 5 needs to send the system information change indicator bit on all POs in every subband in order to reach all types of communication devices. However, this option may require communication devices in RRC_CONNECTED mode to re-tune to their associated paging subband in order to obtain the system information change notification.

Therefore, in this system, dedicated signalling is used for informing RRC_CONNECTED communication devices (at least MTC devices) about a change in system information. For example, if there is on-going data transmission for a particular communication device, it is possible to multiplex the updated system information (at least the changed part thereof) and other data being transmitted to that communication device. Consequently, RRC-CONNECTED communication devices are not required to monitor their associated PO for system information modification because the updated system information is sent via unicast transmission. This may result in improved operation of communication devices, especially MTC devices that operate over a limited bandwidth.

In another option, it may be possible to force a communication device operating in the RRC_CONNECTED to obtain the system information by releasing the communication device's RRC connection. This may be beneficial if, for example, there is no ongoing data transmission to this communication device (thus the risk of data loss is kept minimal). Once its RRC connection is released, the communication device proceeds to read the system information transmitted via the broadcast channel (as per default procedure).

It will be appreciated that the unicast based option and the RRC release based option may be employed together by the base station 5 (depending on implementation).

<Operation—PO Configurations>

In the current LTE standards, a paging occasion (PO) is defined as a subframe where there may be a P-RNTI transmitted on the PDCCH for scheduling a paging message. A radio frame may contain one to four POs. When DRX is used the UE needs to monitor only one PO per DRX cycle.

In the present system, however, the POs are defined such that repetitions for MTC devices are also supported (when appropriate). Specifically, a PO in this system is defined as (the start point of) a bundle of subframes in a certain subband where:

the UE monitors repetitions of ePDCCH for paging message scheduling in case ePDCCH is needed for paging transmission; or the UE monitors repetitions of PDSCH for paging message in case ePDCCH is not needed for paging transmission.

Furthermore, there may be different POs for different sub-bands (e.g. to support MTC devices with different CE levels).

FIGS. 5 to 8 illustrate further details of various PO configuration options and the resulting paging transmissions in this system.

Specifically, the examples shown in FIGS. 5 and 6 illustrate scenarios when paging message transmissions are separated for different coverage enhancement levels.

FIG. 5 illustrates paging message transmissions using ePDCCH (eCSS). In this example, the scheduling information (e.g. time-frequency resource, MCS/TBS) that allows the MTC device to acquire a paging message on the PDSCH is dynamically indicated by in ePDCCH. In this case, a different P-RNTI and/or a different eCSS may be used for each CE level.

FIG. 6 illustrates paging message transmissions without using ePDSCH. This solution may also be referred to a 'control-less' paging, i.e. the scheduling information (e.g. time-frequency resource, MCS/TBS) that allows the MTC device to acquire a paging message on the PDSCH is not indicated dynamically by in ePDCCH, but it is predefined or it is indicated in (or forms part of) the system information). In this case, different time and/or frequency resources (within the PDSCH) may be allocated for different CE levels. It will be appreciated that in the PDSCH based scenario shown in FIG. 6, effectively, a control-less paging may be realised for each CE level, e.g. as described above with reference to FIG. 4.

In the examples shown in FIGS. 7 and 8, paging message transmissions are not separated for different coverage enhancement levels. Specifically, FIG. 7 illustrates paging message transmissions with ePDCCH, and FIG. 8 illustrates paging message transmissions without ePDCCH (e.g. when ePDCCH is not or cannot be used for paging transmissions). It will be appreciated that in the scenario shown in FIG. 8, effectively, a control-less paging may be realised, e.g. as described above with reference to FIG. 4.

<Operation—CE Level Determination>

In the following, a number of options are described for determining an appropriate CE level for a particular MTC device 3-2 in the base station's 5 cell, and to ensure that the same CE level is employed by both the MTC device 3-2 and its serving base station 5 in their communications with each other.

FIG. 9 illustrates an option in which the serving base station 5 (denoted 'eNB') is responsible for the decision on which CE level a particular MTC device (denoted 'UE') should employ in a given cell.

As illustrated in step S92, the base station 5 is configured to determine (using its MTC support module 69) an appropriate CE level for the MTC device 3-2 based on the random access procedure (denoted 'MACH' in FIG. 9) performed between the base station 5 and the MTC device 3-2 in the cell of the base station 5 (as generally shown in step S91).

Once the base station 5 has determined the appropriate CE level for the MTC device 3-2, it informs (in step S93) the core network 7 (e.g. the MME/HSS) which stores this information for later use (e.g. for paging the MTC device 3-2 via this base station 5).

As generally shown in step S94, the base station 5 may also inform the MTC device 3-2 about the determined CE level for its cell, either in a separate message or as part of the random access procedure (e.g. step S94 may form part of step S91). It will be appreciated that the base station 5 may be configured to inform the MTC device about the CE level implicitly, for example, by employing a given number of repetitions (during and/or after the random access procedure) corresponding to the determined CE level.

It will be appreciated that there are a number of ways in which the base station 5 can derive the appropriate CE/repetition level for an MTC device, based on the RACH procedure, including for example:

1) MTC devices with different CE level may use different preamble resources (with corresponding different repetition times) in accordance with an appropriate predetermined relationship mapping between preamble resources and corresponding CE levels. In this case, the base station can determine the appropriate CE level based on which preamble resources (and/or based on the repetition times) used by the MTC device 3-2. In this case however, optionally, the base station may also be configured to use a different CE level than the CE level indicated by the relationship mapping between preamble resources and corresponding CE levels (e.g. if the base station 5 is able to successfully decode the MTC device's preamble transmission by combing fewer repetitions than required for that CE level).

2) Otherwise, if there is no associated preamble resource set configured for each different CE level, then the base station 5 may be configured to determine the coverage level based on a number of repetitions required for successful decoding of the preamble transmitted by the MTC device 3-2.

Furthermore, e.g. if the MTC device 3-2 has never been connected to this cell/or it has not connected to this cell within a predetermined time window, then one or more of the following options may also be used:

3) The base station 5 may be configured to assume the maximum and/or a default CE/repetition level for the MTC device 3-2 in a cell in which the MTC device 3-2 has never been connected (or it has not connected within a predetermined time window).

4) If the MTC device 3-2 reselected to a new cell (of the base station 5), then an appropriate RACH procedure may be triggered (by the MTC module 45) in order to let the base station 5 detect the associated CE level of that MTC device 3-2 in the new cell, otherwise the MTC device 3-2 may not be paged in the new cell until it has performed a RACH procedure via that cell (although the MTC device 3-2 is still being paged in other cells) or the MTC device 3-2 will be paged by assuming the maximum and/or a default CE/repetition in this new cell.

It will be appreciated that if the required CE level of an MTC device changes in a cell (e.g. based on its own estimation), particularly in the current cell in which the MTC device is currently camping, then an appropriate RACH procedure may be triggered (by the MTC module 45) in order to let the base station 5 update the associated CE level stored for the MTC device (for that cell).

Beneficially, therefore, this option allows more control for the base station 5 in the determination of an appropriate CE level. In this case the same MTC device may have different CE/repetition levels in different cells. However, such cell specific CE level can be stored in the core network 7 (MME/HSS), for each MTC device, so that each MTC device can be paged in any cell using the appropriate CE level (and repetitions) required in that cell. Thus, when the MME initiates paging of the MTC device 3-2, in step S95, it includes in its paging request the cell ID(s) and the respective associated CE/repetition level for each cell in which the MTC device 3-2 is to be paged.

As generally shown in step S96, since both the base station 5 and the MTC device 3-2 employ the same CE level, the base station 5 is operable to transmit (and the MTC device 3-2 is operable to monitor) on the correct PO resource corresponding to that CE level. Thus, when in step S97 the base station 5 transmits a paging message (scheduled via the PO in S96) for the MTC device 3-2, it can apply the correct CE level for that MTC device 3-2 (and employ the required number of repetitions, if any).

FIG. 10 illustrates an option in which the MTC device 3-2 is responsible for the decision on which CE level that MTC device 3-2 employs in a given cell.

Specifically, in this case the MTC device's 3-2 determination (in step S102) is based on measurements of the (downlink) radio conditions of a number of cells (e.g. all detected cells) in the vicinity of the MTC device 3-2. It will be appreciated that the MTC device 3-2 may measure the radio conditions for at least its current serving cell, e.g. the cell of the base station 5.

Once the MTC device 3-2 has determined, in step S102, its appropriate CE level for a particular cell (or a set of respective CE levels for a plurality of cells), it informs the core network 7 (e.g. the MME/HSS) about the applicable CE level(s) and (optionally) the corresponding cell ID(s). It will be appreciated that the MTC device 3-2 may report to the applicable CE level(s) (corresponding cell ID(s), if any) as part of a capability report (and/or the like).

It will be appreciated that if the MTC device 3-2 determines (e.g. based on its own estimation/signal quality measurements) that the required CE level (in at least one cell) has changed, particularly in the current cell in which the MTC device 3-2 is currently camping, then the MTC device 3-2 may notify the core network 7 and update the associated CE level stored for the MTC device (for the at least one cell in which the CE level has changed).

It will be appreciated that the MTC device 3-2 may be configured to report/update the CE level when one or more of the following conditions are met: i) the MTC device performs an attach procedure; ii) the MTC device has found a new neighbour cell as paging cell; and iii) the MTC device determines a change in the required CE level and/or a change in radio conditions in a cell.

The core network 7 stores this information for later use (e.g. for paging the MTC device 3-2 in step S105). Steps S105 to S107 correspond to steps S95 to S97 described above, thus their description is omitted herein for simplicity.

A benefit associated with this option is that the required CE levels for a plurality of cells (including e.g. potential paging cells for the MTC device 3-2) can be measured and reported to core network 7 at once.

<Modifications and Alternatives>

Detailed exemplary embodiments have been described above. As those skilled in the art will appreciate, a number of modifications and alternatives can be made to the above exemplary embodiments whilst still benefiting from the inventions embodied therein.

In the above description, repetition in time domain is assumed for all transmissions. However, such repetitions are omitted in FIGS. 4 to 10 for simplicity.

A number of options have been described above, with reference to FIGS. 5 to 8. It will be appreciated that these options are not mutually exclusive and any of the options may be combined within the same system, either within a single cell and/or in neighbouring cells. For example, the base station may be configured to change from one operation mode to another, e.g. periodically, in dependence on the number/type of MTC devices in its cell, in dependence on the overall load in the cell, in dependence on the type of communication (e.g. broadcast/unicast), and/or the like.

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above exemplary embodiments, an LTE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the exemplary embodiments described above, the base station and the communication device each include transceiver circuit. Typically, this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the user device as a signal over a computer network, or on a recording medium. Further, the functionality performed by part or all of this software may be performed using one or more dedicated hardware circuits.

It will be appreciated that the base station may comprise: means for receiving, from a core network entity, a paging request for paging at least one MTC device; means for determining a paging occasion when said at least one MTC device will be sent paging related information, wherein said paging occasion identifies a plurality of subframes in which said paging related information will be first sent and then repeated; and means for sending, and then repeating, said paging related information in said plurality of subframes identified by said paging occasion.

The paging related information may comprise scheduling information identifying time and/or frequency resources to be used for sending a paging message to said at least one MTC device, and said plurality of subframes identified by said paging occasion may be subframes in which a control channel carrying said paging related information will be sent.

The at least one MTC device may comprise at least one coverage enhanced MTC device having a first coverage enhancement level and at least one coverage enhanced MTC device having a second coverage enhancement level that is different to said first coverage enhancement level.

In this case, the paging related information may comprise a first paging identifier (e.g. a radio network temporary identifier) for identifying paging related information for said at least one coverage enhanced MTC device having a first coverage enhancement level, and a second paging identifier (e.g. a different radio network temporary identifier) for identifying paging related information for said at least one coverage enhanced MTC device having a second coverage enhancement level.

The paging related information for said at least one coverage enhanced MTC device having a first coverage enhancement level may be first sent in a control channel in a first subframe, and paging related information for said at least one coverage enhanced MTC device having a second coverage enhancement level may be first sent in a control channel in a second sub-frame that is different to said first subframe.

The paging related information for said at least one coverage enhanced MTC device having a first coverage enhancement level may be sent in a control channel in at least one subframe in which paging related information for said at least one coverage enhanced MTC device having a second coverage enhancement level is also sent using the same control channel.

The paging related information may comprise at least one paging message for said at least one MTC device, and said plurality of subframes identified by said paging occasion may be subframes in which said at least one paging message will be sent and then repeated. In this case, the base station may further comprise means for sending, to said at least one MTC device, scheduling information for identifying resources to be used for sending said at least one paging message, in a system information block. For example, the scheduling information may comprise information identifying a transport block size 'TBS' for said requested paging.

The at least one MTC device may comprise at least one coverage enhanced MTC device having a first coverage enhancement level and at least one coverage enhanced MTC device having a second coverage enhancement level that is different to said first coverage enhancement level.

In this case, the paging message for said at least one coverage enhanced MTC device having a first coverage enhancement level may be sent using a first predetermined frequency resource, and a paging message for said at least one coverage enhanced MTC device having a second coverage enhancement level may be sent using a second predetermined frequency resource that is different to said first predetermined frequency resource.

The paging message for said at least one coverage enhanced MTC device having a first coverage enhancement level may be first sent in a data channel in a first subframe, and a paging message for said at least one coverage enhanced MTC device having a second coverage enhancement level may be first sent in a data channel in a second subframe that is different to said first subframe.

The paging message for said at least one coverage enhanced MTC device having a first coverage enhancement level may be sent in a data channel in at least one subframe in which a paging message for said at least one coverage enhanced MTC device having a second coverage enhancement level is also sent in the same data channel.

If the at least one MTC device comprises at least one coverage enhanced MTC device, then said base station may further comprise means for identifying a coverage enhancement level associated with said at least one coverage enhanced MTC device, and said means for sending, and then repeating, said paging related information may be configured to repeat sending said paging related information for a number of repetitions defined by said coverage enhancement level.

The paging request may comprise information identifying said coverage enhancement level and wherein said means for identifying a coverage enhancement level associated with said at least one coverage enhanced MTC device is configured to identify said coverage enhancement level based on said information identifying said coverage enhancement level in said paging request.

The means for identifying a coverage enhancement level associated with said at least one coverage enhanced MTC device may be configured to identify said coverage enhancement level based on information (e.g. a random access preamble sequence index) obtained during a procedure to set up a random access channel (RACH) with said at least one coverage enhanced MTC device.

If a respective coverage enhancement level cannot be determined for said at least one coverage enhanced MTC device, then said means for sending, and then repeating, said paging related information may be configured to repeat sending said paging related information for a number of repetitions defined in accordance with a predetermined (e.g. a maximum and/or default) coverage enhancement level.

In the above exemplary embodiments, machine-type communication devices and mobile telephones are described. However, it will be appreciated that mobile telephones (and similar user equipment) may also be configured to operate as machine-type communication devices. For example, the mobile telephone 3-1 may include (and/or provide the functionality of) the MTC module 45.

Examples of MTC Applications

It will be appreciated that each communication device may support one or more MTC applications. Some examples of MTC applications are listed in the following table (source: 3GPP TS22.368 V13.1.0, Annex B). This list is not exhaustive and is intended to be indicative of the scope of machine-type communication applications.

TABLE 1

| Service Area | MTC applications |
|---|---|
| Security | Surveillance systems |
| | Backup for landline |
| | Control of physical access |
| | (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |

TABLE 1-continued

| Service Area | MTC applications |
|---|---|
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

Title: Paging for Rel-13 MTC UE

1. Introduction

The repetition is widely needed for both broadcast and unicast channels which address to MTCe UE including low complexity UE in normal coverage and in coverage enhancement, so paging transmission procedure needs to be re-designed for Rel-13 MTCe UE.

In this contribution, we share our views on the following issues:
1. Whether dynamic L1 scheduling i.e. ePDCCH is needed for paging transmission?
2. How to do the paging for system information change?
3. Are the paging messages transmissions separated or not for different types of Rel13 MTC UEs?
4. How to determine the CE/repetition level of a UE for paging transmission?

2. Discussion

In current specification TS 36.304, one Paging Occasion (PO) is a subframe where there may be P-RNTI transmitted on PDCCH addressing the paging message. One Radio Frame contains one or more Paging Occasion(s). When DRX is used the UE needs only to monitor one PO per DRX cycle.

In the context of Rel-13 MTC, since repetition will be needed, PO is not one subframe anymore. We propose to adopt following definition of PO:

Proposal 1: Paging Occasion (PO) is the (start point of) a bundle of subframes in a certain sub-band where:
  The UE monitors the repetitions of ePDCCH for paging message scheduling in case ePDCCH is needed for paging transmission, or
  The UE monitors the repetitions of PDSCH for paging message in case ePDCCH is not needed for paging transmission.

We may have different PO on different sub-bands.

2.1 Paging for System Information Change

As we know, the paging message is also used to inform UEs in RRC_IDLE and UEs in RRC_CONNECTED about a system information change. The system information change paging is one bit indicator and transmitted together with other normal paging records if any. When it is about to change any system information element, eNB has to transmit this indicator on all POs for all UEs to guarantee all UEs will be informed in time.

In the context of Rel-13 MTC, let's discuss system information modification for UEs in RRC-IDLE and RRC-CONNECTED mode separately:

System information change for UEs in RRC_IDLE

Option1: Paging for System Information Modification is Transmitted Together with Normal Paging Records (as Legacy)

With this option, eNB has to send the paging on all POs addressing to all types of Rel-13 MTC UEs as legacy. The effort to send on all POs is much bigger than legacy due to hundreds of repetitions.

Option 2: Paging for System Information Modification is Separated from Normal Paging With this option, the paging for system information has to be transmitted in a common sub-band, and all UEs shall work on this common sub-band and try to monitor the paging occasions for system information modification. This means all Rel-13 MTC UEs cannot be scheduled in other sub-band during the paging occasions for system modification. Moreover this would be additional paging monitoring work from UE perspective, and lead to more power consumption.

Considering the system information change will be very rare, we slightly prefer option 1:

Proposal: System Information Modification Indicator is Transmitted Together with Normal Paging Record(s).

System Information Change for UEs in RRC_CONNECTED

Option1: Notification of the System Information Change Via Paging (as Legacy)

It is likely that UE in RRC_CONNECTED mode is scheduled on a sub-band different from the sub-band for monitoring paging. This will require UE to re-tune to the sub-band for paging and for the system information reading.

Option2: Send the New System Information Via Dedicated Signalling:

UE can keep working on the sub-band for unicast channels. If there is a large amount of rel13 UE in RRC-CONNECTED, it will be very costly to send the changed system information one UE by one UE. However if there is on-going data transmission to the target UE, by multiplexing the system information and the data, it will be less costly provided only changed part of SI will be sent to UE.

Option3: Release RRC Connection

If there is no ongoing data transmission to a UE, then another possible choice is to release this UE, hence the UE will read the system information via broadcast channel.

Option 2 and option 3 can work together by eNB implementation. Considering the UE in coverage enhancement will be kept in RRC-CONNECTED mode only if there is on-going data, it is propose:

Proposal: Dedicated Signalling Will be Used for System Information Change for RRC-CONNECTED REL13 MTC UEs, i.e. RRC-CONNECTED REL13 MTC UEs are not Required to Monitoring Paging for System Information Modification.

2.2 with or without ePDCCH

Similar to system information transmission, one key question regarding paging transmission is whether dynamic L1 scheduling information in ePDCCH is needed or not, we have pros and cons analysis as below:

Without ePDCCH (i.e. without dynamic L1 scheduling information):

Lack of scheduling flexibility: the radio resource for paging transmissions, modulation order, coding rate cannot be changed dynamically Fixed TBS/MCS and Radio Resource: fixed number (e.g. only 1) of UE can be paged in one PO.

Extra paging delay if there is no space to accommodate all paging requests: when more UE needs to be paged, eNB could delay the paging to next PO, this will cause scheduling delay.

Paging capacity limit due to the fixed TBS. on the other hand, more POs can be configured to increase the paging capacity, however it will cause more UE power consumption to monitor more POs.

Save the resource use for ePDCCH transmission.

With ePDCCH (i.e. with dynamic L1 scheduling information)

More scheduling flexibility: the radio resource for paging transmissions, modulation order, coding rate can be changed dynamically Changeable TBS/MCS and Radio Resource: number of UEs paged in one PO is flexible.

Paging capacity is adaptive to the paging request.

More radio resource used for ePDCCH transmission.

Double power consumption: for each PO, UE has to monitor ePDCCH bundle first and then the PDSCH bundle if ePDCCH with P-RNTI detected (this is very likely). This means double power consumption in maximum due to the ePDCCH-PDSCH two-step paging monitoring Comparing "without ePDCCH" option, "with ePDCCH" option has obvious flexibility in term of scheduling, paging capacity and is more adaptive. However it is not clear it will be more resource efficient thinking extra resource required for ePDCCH repetitions. Also it will result in much more awake time and increased power consumption from UE point of view. A compromised way is to allow limited flexibility on top of the option "without ePDCCH", e.g. to indicate/adjust the TB size of paging message in system information based on e.g. MTC paging load of the cell.

Proposal: RAN2 Consider to not have Dynamic L1 Scheduling Information in ePDCCH but Indicate Limited Scheduling Information e.g. TBS in SI for Paging Transmission.

2.3 Separated or not

RAN1 agreed that the paging messages for Rel-13 low-complexity UEs and/or UEs operating in coverage enhancements (CE) are transmitted separately from paging messages for other UEs. It has not been confirmed whether paging messages for Rel-13 low-complexity UEs operating in normal coverage and operating in different coverage enhancements (CE) are transmitted separately or not.

In the following discussion, we do not particularly mention LC Rel-13 MTC UE in normal coverage. Low complexity UE in normal coverage can be considered as one special repetition/CE level e.g. CE level0, since UE position is unknown for NW, so cell edge coverage is assumed when calculating the repartition times.

If they are Separated:

For each CE level, separated ePDCCH/PDSCH transmission is needed. When there is one paging targeting a UE in CE level 1 and another paging targeting a UE in CE level2, two ePDCCH is needed if ePDCCH is there, or two PDSCHs are needed if ePDCCH is not there. There may be more PDSCH load due to separate padding for different TBs. Regarding system information modification, eNB has to send paging/paging scheduling on all POs corresponding to all repetition levels, and this also means more resource consumption. UE and network side shall strictly have the same assumption on the repetition level in all situations, otherwise, it will result in misalignment between transmission and monitoring resource, and then paging will always fail.

If they are not Separated:

As shown in figure, repetition times should be the maximum value required by all paged UEs. When there is one paging targeting a UE in CE level 1 requiring N times of repetitions and another paging targeting a UE in CE level4 requiring M times of repetitions, wherein M>N, eNB will transmit the paging message including both paging records of these two UEs with M times of repetitions. In the control of eNB implementation, when the repetition times between paged UEs are too much different, and there are many paging requests, UE can group the similar CE level UEs' pagings together and page different groups in different time at the cost of extra paging delay. From UE point of view, Different CE level UEs try to combine ePDCCH/PDSCH on enough number of sub frames. Follow the same example, UE in CE level 1 try to decode the combination of N subframes ePDCCH/PDSCH, but UE in CE level 4 try to decode the combination of M subframes ePDCCH/PDSCH to check if it is paged. If there is only small amount of paging requests, it might be more resource efficient by multiplexing paging records even though they have very different repetition times. There will be less resource consumption for paging of system information modification.

If ePDCCH is there, for the "separated option", even though different ePDCCH is needed for different CE levels, it is still possible to multiplex paging records addressing to different CE level into one PDSCH/TB, in a way that all ePDCCHs point to the same PDSCH.

We slightly prefer not to separate the paging transmission for different type of Rel-13 MTC UEs based on above analysis:

Proposal: not to separate the paging transmissions for different type of Rel-13 MTC UEs, i.e. Network may transmit paging records addressing to different type/CE level Rel-13 MTC UEs in one paging message.

2.4 CE Level Determination

To determine the CE level of UE in a certain cell, there are two options:

Option 1: eNB-Based [as Shown in FIG. 9] eNB makes the final decision on which CE level the UE is in a given cell, and then inform CN and also maybe inform UE to align the understanding. This option allows more control in eNB side. The same UE possibly has different CE/repetition level in different cell, and in order to allow to page a UE in more than one cells as we have today, the CE levels in all cells have to be collected one by one based on RACH procedure.

Option 2: UE-Based [as Shown in FIG. 10]

UE measures the DL radio condition of all detected cells, and determine the CE levels in each cells, and then report to CN e.g. as part of capability report. eNB has less control with this option, we have to make sure the UE will not abuse this and report higher CE level than it needs. The CE levels in all paging cells can be measured and reported in one shot to network.

Proposal: RAN2 Discuss Whether the CE Level Determination is UE Based or eNB Based.

The whole or part of the exemplary embodiments disclosed above can be described as, but not limited to, the following supplementary note.

(Supplementary note 1) A base station for a communication system in which machine type communication 'MTC' devices communicate via said base station, the base station comprising: means for receiving, from a core network entity, a paging request for paging at least one MTC device;

means for determining a paging occasion when said at least one MTC device will be sent paging related information, wherein said paging occasion identifies a plurality of subframes in which said paging related information will be first sent and then repeated; and means for sending, and then repeating, said paging related information in said plurality of subframes identified by said paging occasion.

(Supplementary note 2) The base station according to Supplementary note 1, wherein said paging related information comprises scheduling information identifying time and/or frequency resources to be used for sending a paging message to said at least one MTC device, and wherein said plurality of subframes identified by said paging occasion are subframes in which a control channel carrying said paging related information will be sent.

(Supplementary note 3) The base station according to Supplementary note 2, wherein said at least one MTC device comprises at least one coverage enhanced MTC device having a first coverage enhancement level and at least one coverage enhanced MTC device having a second coverage enhancement level that is different to said first coverage enhancement level.

(Supplementary note 4) The base station according to Supplementary note 3, wherein said paging related information comprises a first paging identifier (e.g. a radio network temporary identifier) for identifying paging related information for said at least one coverage enhanced MTC device having a first coverage enhancement level, and a second paging identifier (e.g. a different radio network temporary identifier) for identifying paging related information for said at least one coverage enhanced MTC device having a second coverage enhancement level.

(Supplementary note 5) The base station according to Supplementary note 3, wherein paging related information for said at least one coverage enhanced MTC device having a first coverage enhancement level is first sent in a control channel in a first subframe, and paging related information for said at least one coverage enhanced MTC device having a second coverage enhancement level is first sent in a control channel in a second sub-frame that is different to said first subframe.

(Supplementary note 6) The base station according to Supplementary note 3, wherein paging related information for said at least one coverage enhanced MTC device having a first coverage enhancement level is sent in a control channel in at least one subframe in which paging related information for said at least one coverage enhanced MTC device having a second coverage enhancement level is also sent using the same control channel.

(Supplementary note 7) The base station according to Supplementary note 1, wherein said paging related information comprises at least one paging message for said at least one MTC device, and wherein said plurality of subframes identified by said paging occasion are subframes in which said at least one paging message will be sent and then repeated.

(Supplementary note 8) The base station according to Supplementary note 7, wherein said base station further comprises means for sending, to said at least one MTC device, scheduling information for identifying resources to be used for sending said at least one paging message, in a system information block.

(Supplementary note 9) The base station according to Supplementary note 8, wherein said scheduling information comprises information identifying a transport block size 'TBS' for said requested paging.

(Supplementary note 10) The base station according to any of Supplementary notes 7 to 9, wherein said at least one MTC device comprises at least one coverage enhanced MTC device having a first coverage enhancement level and at least one coverage enhanced MTC device having a second coverage enhancement level that is different to said first coverage enhancement level.

(Supplementary note 11) The base station according to Supplementary note 10, wherein a paging message for said at least one coverage enhanced MTC device having a first coverage enhancement level is sent using a first predetermined frequency resource, and a paging message for said at least one coverage enhanced MTC device having a second coverage enhancement level is sent using a second predetermined frequency resource that is different to said first predetermined frequency resource.

(Supplementary note 12) The base station according to Supplementary note 10, wherein a paging message for said at least one coverage enhanced MTC device having a first coverage enhancement level is first sent in a data channel in a first subframe, and a paging message for said at least one coverage enhanced MTC device having a second coverage enhancement level is first sent in a data channel in a second subframe that is different to said first subframe.

(Supplementary note 13) The base station according to Supplementary note 10, wherein a paging message for said at least one coverage enhanced MTC device having a first coverage enhancement level is sent in a data channel in at least one subframe in which a paging message for said at least one coverage enhanced MTC device having a second coverage enhancement level is also sent in the same data channel.

(Supplementary note 14) The base station according to any of Supplementary notes 1 to 9, wherein said at least one MTC device comprises at least one coverage enhanced MTC device, wherein said base station further comprises means for identifying a coverage enhancement level associated with said at least one coverage enhanced MTC device, and wherein said means for sending, and then repeating, said paging related information is configured to repeat sending said paging related information for a number of repetitions defined by said coverage enhancement level.

(Supplementary note 15) The base station according to Supplementary note 14, wherein said paging request comprises information identifying said coverage enhancement level and wherein said means for identifying a coverage enhancement level associated with said at least one coverage enhanced MTC device is configured to identify said coverage enhancement level based on said information identifying said coverage enhancement level in said paging request.

(Supplementary note 16) The base station according to Supplementary note 14, wherein said means for identifying a coverage enhancement level associated with said at least one coverage enhanced MTC device is configured to identify said coverage enhancement level based on information (e.g. a random access preamble sequence index) obtained during a procedure to set up a random access channel (RACH) with said at least one coverage enhanced MTC device.

(Supplementary note 17) The base station according to Supplementary note 14, wherein if a respective coverage enhancement level cannot be determined for said at least one coverage enhanced MTC device, then said means for sending, and then repeating, said paging related information is configured to repeat sending said paging related information for a number of repetitions defined in accordance with a predetermined (e.g. a maximum and/or default) coverage enhancement level.

(Supplementary note 18) A base station for a communication system in which machine type communication 'MTC' devices communicate via said base station, the base station comprising: means for receiving, from a core network entity, a paging request for paging at least one MTC device;

means for determining a paging occasion when said at least one MTC device will be sent a paging message;

means for sending, to said at least one MTC device, scheduling information for identifying resources to be used for sending said paging message, in a system information block; means for sending, to said at least one MTC device, said paging message using said resources in accordance with said paging occasion.

(Supplementary note 19) A base station for a communication system in which machine type communication 'MTC' devices communicate via said base station, the base station comprising: means for receiving, from a core network entity, a paging request for paging at least one coverage enhanced MTC device;

means for identifying a coverage enhancement level associated with said at least one coverage enhanced MTC device; and means for sending paging related information and then repeating sending said paging related information for a number of repetitions defined by coverage enhancement level.

(Supplementary note 20) A base station for a communication system in which machine type communication 'MTC' devices communicate via said base station, the base station comprising: means for determining that there is a requirement to notify said MTC devices that there has been a change in system information resulting in modified system information;

means for notifying any idle mode MTC devices that there has been a change in system information by sending a notification together with any paging records for said MTC devices using a paging message; and means for providing any radio resource control 'RRC' connected mode MTC devices with at least a modified part of the modified system information using MTC device dedicated signalling (e.g. unicast/dedicated RRC signalling).

(Supplementary note 21) A machine type communication 'MTC' device for communicating with a base station, the MTC device comprising:

means for determining a paging occasion when said base station may send paging related information, wherein said paging occasion identifies a plurality of subframes in which said paging related information will be first sent and then repeated by said base station; and means for receiving said paging related information in said plurality of subframes identified by said paging occasion.

(Supplementary note 22) A machine type communication 'MTC' device for a communication system in which machine type communication 'MTC' devices communicate via a base station, the MTC device comprising:

means for obtaining, from a system information block broadcast by said base station, scheduling information for identifying resources to be used for sending at least one paging message; means for determining a paging occasion when said base station may send a paging message for said MTC device;

means for determining, from said scheduling information said resources to be used for sending at least one paging message; and means for receiving said paging message using said resources in accordance with said paging occasion.

(Supplementary note 23) A machine type communication 'MTC' device for a communication system in which MTC devices communicate via a base station, the MTC device comprising: means for performing measurements for establishing a measure of a signal quality associated with at least one cell;

means for determining, based on said measure of a signal quality associated with at least one cell, a respective coverage enhancement level associated with said at least one cell; and means for sending said respective coverage enhancement level associated with said at least one cell to said base station.

(Supplementary note 24) A machine type communication 'MTC' device for a communication system in which MTC devices communicate via a base station, the MTC device comprising: means for forming a radio resource control 'RRC' connection with said base station to enter an RRC connected mode;

a transceiver configured to obtain, using dedicated signalling (e.g. unicast/dedicated RRC signalling), (at least a modified part of) modified system information associated with a cell of the base station, when in said RRC connected mode.

(Supplementary note 25) A core network node (e.g. a mobility management entity) for a communication system, the core network node comprising:

means for obtaining information identifying a coverage enhancement level required in a cell of a base station for at least one coverage enhanced MTC device;

means for generating a paging request for paging said at least one coverage enhanced MTC device via said base station, wherein said paging request includes said information identifying said coverage enhancement level required in said cell of a base station for said at least one coverage enhanced MTC device; and means for sending said paging request to said base station for paging said at least one coverage enhanced MTC device in said cell in accordance with said coverage enhancement level required in said cell.

(Supplementary note 26) A system comprising the base station according to any of Supplementary notes 1 to 20, the MTC device according to any of Supplementary notes 21 to 24, and the core network node according to Supplementary note 25.

(Supplementary note 27) A method performed by a base station in a communication system in which machine type communication 'MTC' devices communicate via said base station, the method comprising:

receiving, from a core network entity, a paging request for paging at least one MTC device;

determining a paging occasion when said at least one MTC device will be sent paging related information, wherein said paging occasion identifies a plurality of subframes in which said paging related information will be first sent and then repeated; and sending, and then repeating, said paging related information in said plurality of subframes identified by said paging occasion.

(Supplementary note 28) A method performed by a base station for a communication system in which machine type communication 'MTC' devices communicate via said base station, the method comprising:

receiving, from a core network entity, a paging request for paging at least one MTC device;

determining a paging occasion when said at least one MTC device will be sent a paging message;

sending, to said at least one MTC device, scheduling information for identifying resources to be used for sending said paging message, in a system information block;

sending, to said at least one MTC device, said paging message using said resources in accordance with said paging occasion.

(Supplementary note 29) A method performed by a base station for a communication system in which machine type communication 'MTC' devices communicate via said base station, the method comprising:

receiving, from a core network entity, a paging request for paging at least one coverage enhanced MTC device;

identifying a coverage enhancement level associated with said at least one coverage enhanced MTC device; and sending paging related information and then repeating sending said paging related information for a number of repetitions defined by coverage enhancement level.

(Supplementary note 30) A method performed by a base station for a communication system in which machine type communication 'MTC' devices communicate via said base station, the method comprising:

determining that there is a requirement to notify said MTC devices that there has been a change in system information resulting in modified system information;

notifying any idle mode MTC devices that there has been a change in system information by sending a notification together with any paging records for said MTC devices using a paging message; and providing any radio resource control 'RRC' connected mode MTC devices with at least a modified part of the modified system information using MTC device dedicated signalling (e.g. unicast/dedicated RRC signalling).

(Supplementary note 31) A method performed by a machine type communication 'MTC' device for communicating with a base station, the method comprising:

determining a paging occasion when said base station may send paging related information, wherein said paging occasion identifies a plurality of subframes in which said paging related information will be first sent and then repeated by said base station; and receiving said paging related information in said plurality of subframes identified by said paging occasion.

(Supplementary note 32) A method performed by a machine type communication 'MTC' device in a communication system in which machine type communication 'MTC' devices communicate via a base station, the method comprising:

obtaining, from a system information block broadcast by said base station, scheduling information for identifying resources to be used for sending at least one paging message;

determining a paging occasion when said base station may send a paging message for said MTC device;

determining, from said scheduling information said resources to be used for sending at least one paging message; and receiving said paging message using said resources in accordance with said paging occasion.

(Supplementary note 33) A method performed by a machine type communication 'MTC' device in a communication system in which MTC devices communicate via a base station, the method comprising:

performing measurements for establishing a measure of a signal quality associated with at least one cell;

determining, based on said measure of a signal quality associated with at least one cell, a respective coverage enhancement level associated with said at least one cell; and sending said respective coverage enhancement level associated with said at least one cell to said base station.

(Supplementary note 34) A method performed by a machine type communication 'MTC' device in a communication system in which MTC devices communicate via a base station, the method comprising:

forming a radio resource control 'RRC' connection with said base station to enter an RRC connected mode; and obtaining, using dedicated signalling (e.g. unicast/dedicated RRC signalling), (at least a modified part of) modified system information associated with a cell of the base station, when in said RRC connected mode.

(Supplementary note 35) A method performed by a core network node (e.g. a mobility management entity) for a communication system, the method comprising:

obtaining information identifying a coverage enhancement level required in a cell of a base station for at least one coverage enhanced MTC device;

generating a paging request for paging said at least one coverage enhanced MTC device via said base station, wherein said paging request includes said information identifying said coverage enhancement level required in said cell of a base station for said at least one coverage enhanced MTC device; and sending said paging request to said base station for paging said at least one coverage enhanced MTC device in said cell in accordance with said coverage enhancement level required in said cell.

(Supplementary note 36) A computer implementable instructions product comprising computer implementable instructions for causing a programmable communications device to perform the method of any of Supplementary notes 27 to 35.

This application is based upon and claims the benefit of priority from United Kingdom Patent Application No. 1506156.7, filed on Apr. 10, 2015, the disclosure of which is incorporated herein in its entirety by reference.

The invention claimed is:

1. A user equipment (UE) configured to communicate with a base station, the UE comprising:
a memory storing instructions; and
at least one processor configured to process the instructions to:
establish a Radio Resource Control (RRC) connection with the base station to enter an RRC connected mode; and
receive, from the base station, in a case in which the UE is in the RRC connected mode and the UE has a subband with no common search space configured to monitor system information or paging, a dedicated signaling message including part of system information for a cell of the base station, including configuration information for paging for the UE.

2. A base station configured to communicate with a user equipment (UE), the base station comprising:
a memory storing instructions; and
at least one processor configured to process the instructions to:
establish a Radio Resource Control (RRC) connection with the UE for the UE to enter an RRC connected mode; and
in a case in which the UE is in the RRC connected mode and the UE has a subband with no common search space configured to monitor system information or paging, transmit, to the UE, a dedicated signaling message including part of system information for a cell of the base station, including configuration information for paging occasion for the UE.

3. A method performed by a user equipment (UE) configured to communicate with a base station, the method comprising:
establishing a Radio Resource Control (RRC) connection with the base station to enter an RRC connected mode; and
receiving, from the base station, in a case in which the UE is in the RRC connected mode and the UE has a subband with no common search space configured to monitor system information or paging, a dedicated signaling message including part of system information for a cell of the base station, including configuration information for paging for the UE.

4. A method performed by a base station configured to communicate with a user equipment (UE), the method comprising:
establishing a Radio Resource Control (RRC) connection with the UE for the UE to enter an RRC connected mode; and
in a case in which the UE is in the RRC connected mode and the UE has a subband with no common search space configured to monitor system information or paging, transmitting a dedicated signaling message including part of system information for a cell of the base station, including configuration information for paging for the UE.

* * * * *